United States Patent [19]

Kehl

[11] 4,079,994

[45] Mar. 21, 1978

[54] SEAT WITH REMOVABLE CUSHION

[75] Inventor: Norman J. Kehl, Elk Grove Village, Ill.

[73] Assignee: Coach and Car Equipment Corporation, Elk Grove Village, Ill.

[21] Appl. No.: 765,042

[22] Filed: Feb. 2, 1977

[51] Int. Cl.² .............................................. A47C 7/00
[52] U.S. Cl. .................................... 297/440; 297/218;
297/444; 297/452; 297/455
[58] Field of Search ............... 297/218, 219, 283, 440, 297/441, 443, 444, 452, 455, 456, 458, 460

[56] References Cited

U.S. PATENT DOCUMENTS

| 2,783,828 | 3/1957 | Weill | 297/455 X |
| 3,288,529 | 11/1966 | Koch | 297/460 |
| 3,529,866 | 9/1970 | Getz | 297/452 |

Primary Examiner—James C. Mitchell
Attorney, Agent, or Firm—Merriam, Marshall & Bicknell

[57] ABSTRACT

A seat cushion is readily installed onto and removed from a seat frame utilizing structure which disengages the seat cushion from the frame upon manually flexing the cushion and engages the cushion with the frame upon unflexing the cushion.

10 Claims, 7 Drawing Figures

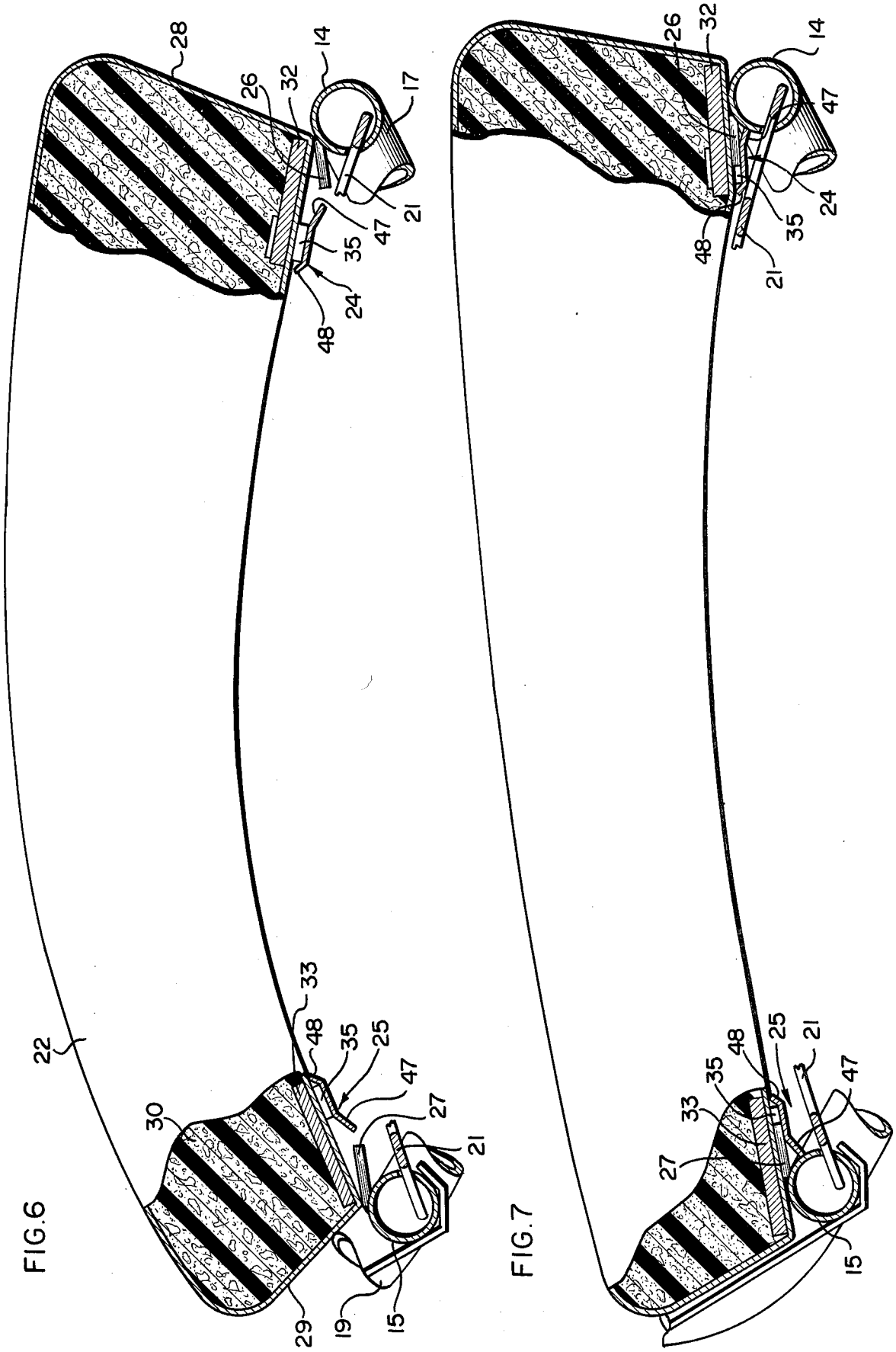

SEAT WITH REMOVABLE CUSHION

BACKGROUND OF THE INVENTION

The present invention relates generally to seats for use on mass transit vehicles such as buses or subway cars, and more particularly to seats of that type in which the seat cushion is removable.

In mass transit vehicles, a seat cushion cover is subjected to extreme conditions of wear, requiring relatively frequent replacement of the seat cushion cover by maintenance personnel. If the seat cushion is not readily removable or reinstallable, or if a high degree of skill or special tools are required to accomplish these operations, removal and reinstallation of a seat cushion can entail substantial expenditure of time, effort and money. On the other hand, if the seat cushion is too easily removable utilizing removal techniques which are readily discernible even to one uninstructed in these techniques, there can be a pilferage problem, or a problem with loose seat cushions lying around. In other words, the seat cushion should be a relatively permanent fixture on the seat while still being readily removable and reinstallable.

SUMMARY OF THE INVENTION

In accordance with the present invention, there is provided a seat having a seat cushion which is readily removable from and reinstallable on the seat, for repair or replacement of the seat cushion cover, without requiring tools or a high degree of skill by one who has been properly instructed in the removal and reinstallation techniques. Otherwise, the seat cushion is a relatively permanent fixture on the seat.

Other features and advantages are inherent in the structure claimed and disclosed or will become apparent to those skilled in the art from the following detailed description in conjunction with the accompanying diagrammatic drawing.

BRIEF DESCRIPTION OF THE DRAWING

FIG. 6 is a fragmentary side elevational view, partially in section, illustrating the seat cushion in a flexed condition disengaged from the seat frame; and FIG. 7 is a fragmentary side-sectional view, partially in section, illustrating the seat cushion in an unflexed condition, engaged on the seat frame.

DETAILED DESCRIPTION

Figure 1:
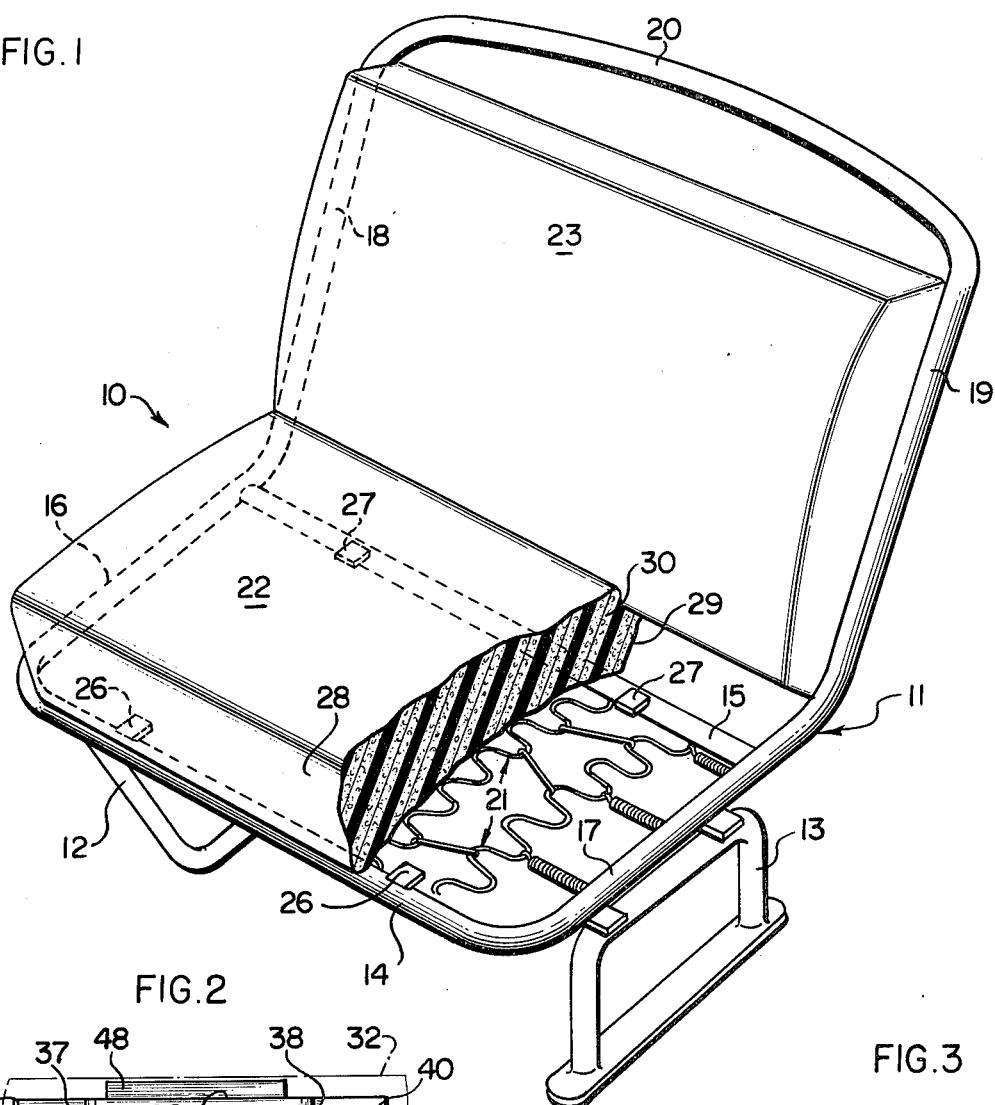
FIG. 1 is a perspective, partially cut-away, of a transit seat having a removable seat cushion in accordance with an embodiment of the present invention.
Figure 4:
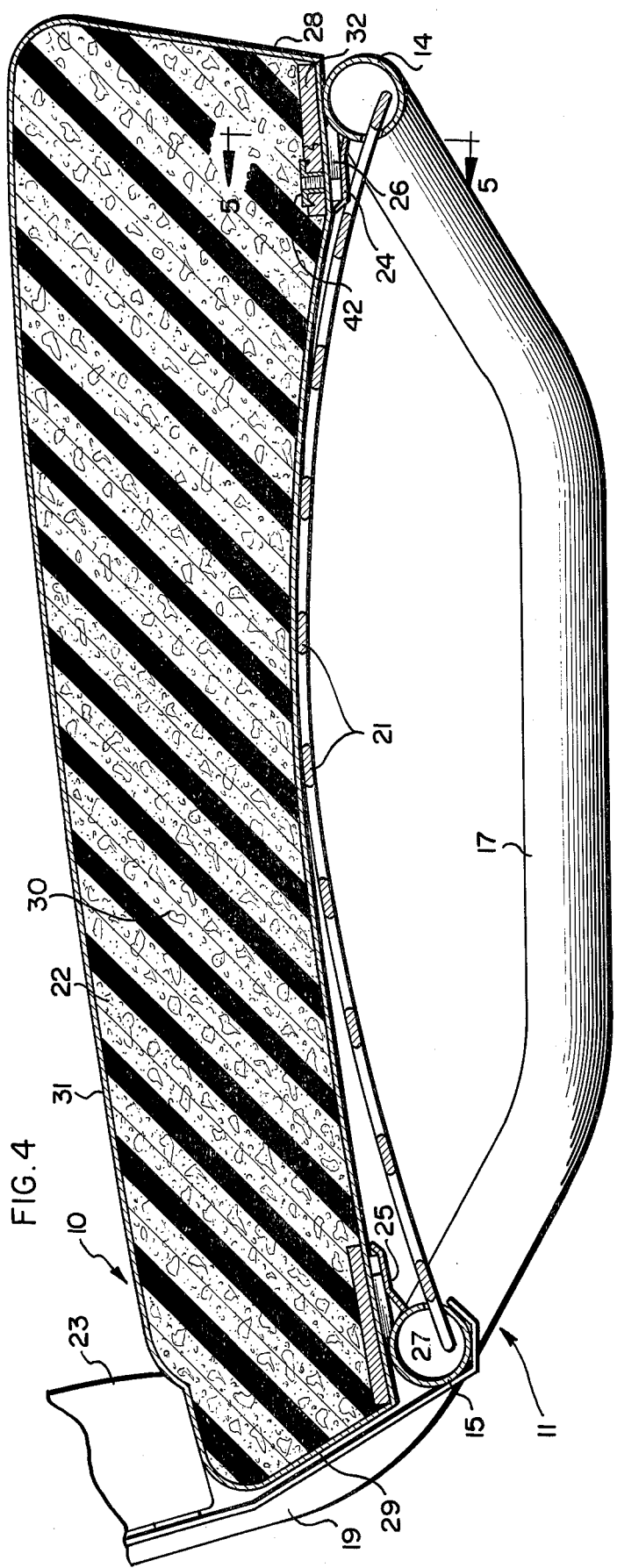
FIG. 4 is a side-sectional view of the seat cushion mounted on the seat frame.

Referring initially to FIGS. 1 and 4, indicated generally at 10 is a seat having a frame indicated generally at 11, a seat cushion 22 and a back cushion 23. Frame 11 comprises a first or front end member 14 and a second or back end member 15. Integral with front end member 14 are a pair of side members 16, 17, and integral with side members 16, 17 are back members 18, 19, respectively, in turn joined by a top member 20 integral with side members 18, 19. Back cushion 23 is mounted on back members 18, 19 utilizing conventional mounting structure (not shown), and seat cushion 22 is mounted on the frame's front and back end members 14, 15 by structure to be described below. Mounted on frame 11 between front and back end members 14, 15 and between side members 16, 17 is conventional serpentine spring means 21.

Seat cushion 22 comprises a pad composed of foam rubber, for example, enclosed within a fabric cover 31 which is held in a closed condition over pad 30 by zipper means, not shown.

Figure 5:
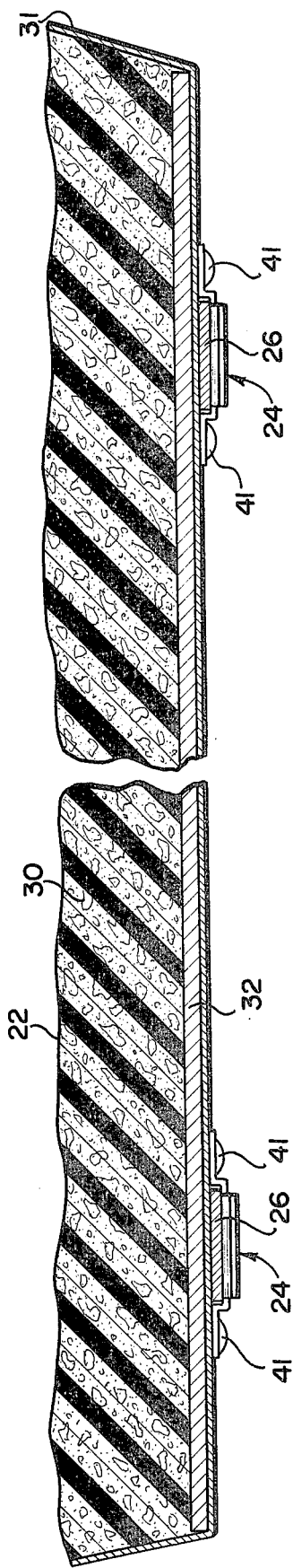
FIG. 5 is a sectional view taken along lines 5—5 in FIG. 4.

Seat cushion 22 has a pair of opposite ends comprising a front end 28 and a back end 29. Connected to the bottom of the seat cushion, adjacent front end 28 thereof, are a plurality of first mounting elements 24 (FIGS. 4 and 5). Connected to the bottom of the seat cushion, adjacent back end 29 thereof, are a plurality of second mounting elements 25 (FIG. 4).

Referring to FIGS. 2–5, mounted on front end member 14 of frame 11 are a plurality of horizontally disposed tongues 26 extending inwardly from front end member 14 toward back end member 15. Mounted on back end member 15 are a plurality of horizontally disposed tongues 27 extending inwardly from back member 15 toward front member 14.

Located on the bottom of seat cushion 22, near front end 28 thereof, is a rigid front strip 32. Located on the bottom of cushion 22 near back end 29 thereof is a rigid rear strip 33. Strips 32, 33 extend from one side to the other of seat cushion 22. These rigid strips may be composed of wood, plastic, metal or the like. First and second mounting elements 24, 25 are respectively attached to front and rear strips 32, 33 by structure described below.

Mounting elements 24, 25 are identical and interchangeable, the only difference between them being that they face in opposite directions, mounting element 24 facing toward the front of seat cushion 22, and mounting element 25 facing toward the rear of seat cushion 22.

Figure 2:
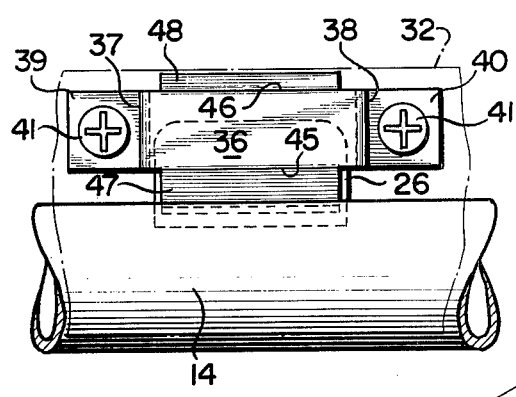
FIG. 2 is an enlarged fragmentary bottom view illustrating a mounting element for the seat cushion, with the mounting element in an engaged position relative to the frame of the seat.
Figure 3:
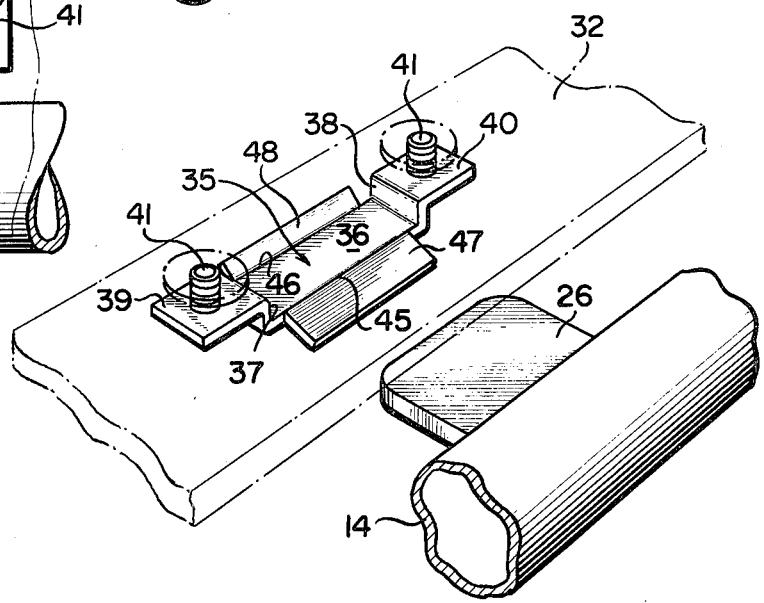
FIG. 3 is a fragmentary perspective illustrating the mounting element in a disengaged position.

As best shown in FIGS. 2–3, each mounting element 24, 25 comprises receiving means 35 having a channel-shaped vertical cross-section including a web portion 36 and a pair of upstanding flange portions 37, 38 each integral with a respective outwardly extending wing portion 39, 40. Threaded fasteners 41, extend upwardly through openings (not shown) in wing portions 39, 40 and engage within T-nuts 42 (FIG. 4) extending downwardly through openings (not shown) in strips 32, 33 to connect mounting elements 24, 25 to the bottom of seat cushion 22.

Referring to FIGS. 2–3 and 6–7, the web portion of each mounting element comprises an outward end 45 and an inward end 46. Integral with outward end 45 is guide means 47, ramp-shaped and extending downwardly and outwardly from receiving means 35 and away from the cushion end at the opposite end of the cushion. Extending integrally from the inward end 46 of web portion 36 is planar-shaped deflecting means 48 extending upwardly and inwardly from receiving means 35 toward the cushion end at the opposite end of the cushion.

As shown in FIG. 5, each of the mounting elements 24, 24 at the front end of the cushion are spaced apart horizontally, in the width-wise direction of the seat, and each of the tongues 26, 26 on front end member 14 are spaced apart a corresponding distance so as to be aligned with a respective mounting element 24. The same spacing and alignment holds true for the second mounting elements 25, 25 and the tongue means 27, 27 on back end member 15.

The pad 30 and fabric 31 of seat cushion 22 are sufficiently flexible to permit the seat cushion to be flexed and unflexed between a disengaged condition illustrated in FIG. 6 and an engaged condition shown in FIG. 7. To assemble seat cushion 22 onto frame 11, the seat cushion is rested atop tongues 26, 27 and then flexed to the condition shown in FIG. 6, merely by pushing together the two ends 28, 29 of the cushion. This causes the first and second mounting elements 24, 25 to be moved toward each other and away from the corresponding front and rear end members 14, 15.

After the seat cushion has been flexed into the condition illustrated in FIG. 6, the ends of the seat cushion are released, causing the seat cushion to unflex. As the seat cushion unflexes, mounting elements 24, 25 move toward the adjacent end members 14, 15. As this movement occurs, the guide means 47 on each mounting element guides the adjacent tongue means 26 or 27 into the channel-shaped receiving means 35 on that mounting element to engage the tongues within the receiving means, and the seat cushion assumes the condition illustrated in FIG. 7. In this condition mounting elements 24, 25 engage tongues 26, 27 to prevent removal of seat cushion 22 from seat frame 11.

To remove seat cushion 22 from frame 11, the ends 28, 29 of the seat cushion are pushed together, thus flexing the seat cushion from the condition illustrated in FIG. 7 to the condition illustrated in FIG. 6 wherein the mounting elements 24, 25 are disengaged from the tongues 26, 27 thereby permitting removal of the seat cushion 22 from the seat frame. When the seat cushion is flexed from the condition illustrated in FIG. 7, to the condition illustrated in FIG. 6, the mounting elements 24, 25 are moved away from the adjacent end members 14, 15 of the frame and toward serpentine spring means 21. When this occurs, deflecting means 48 on each mounting element 24, 25 act to prevent the mounting elements from snagging on the serpentine spring means.

Thus seat cushion 22 may be assembled onto and disassembled from seat frame 11 without any tools and without any degree of skill by one who is properly instructed in the technique of installation and removal. Once installed on the frame, using the proper installation technique, the seat cushion 22 is a relatively permanent fixture on the frame and is not readily removable by one who has not been instructed in the removal technique. Thus, merely pulling upwardly on the seat cushion will not remove it from the frame because of the engagement of web portion 36 of receiving means 35 with the bottom of tongues 26, 27 attached to the seat frame.

The foregoing detailed description has been given for clearness of understanding only and no unnecessary limitations should be understood therefrom as modifications will be obvious to those skilled in the art.

I claim:

1. In a seat:
   a frame having spaced-apart first and second end members;
   serpentine spring means mounted on said frame between said end members:
   a seat cushion having a pair of opposite ends;
   a first mounting element connected to the bottom of said seat cushion adjacent one end thereof;
   a first horizontally disposed tongue means on said first end member and extending inwardly therefrom toward said second end member;
   means on said mounting element for receiving said tongue means;
   guide means on said mounting element for guiding said tongue means toward said receiving means in response to movement of said mounting element toward said first end member;
   and deflecting means on the mounting element for preventing said mounting element from snagging on said serpentine spring means in response to movement of said mounting element away from said first end member;
   said seat cushion comprising flexible means for permitting said seat cushion to be flexed and unflexed to move said first mounting element respectively away from and toward said first end member.

2. In a seat as recited in claim 1 wherein:
   said guide means extends downwardly and outwardly from said receiving means away from the other cushion end opposite said one cushion end.

3. In a seat as recited in claim 1 wherein:
   said deflecting means extends upwardly and inwardly from said receiving means toward said other cushion end.

4. In a seat as recited in claim 1:
   a second mounting element connected to the bottom of said seat cushion, adjacent the other cushion end opposite said one cushion end, so as to undergo movement away from and toward said second end member in response to flexing and reflexing respectively of said flexible means;
   a second horizontally disposed tongue means on said second end member and extending inwardly therefrom toward said first end member;
   means on said second mounting element for receiving said second tongue means;
   guide means on said second mounting element for guiding said second tongue means toward said receiving means on the second mounting element in response to movement of said second mounting element toward said second end member;
   and deflecting means on the second mounting element for preventing said second mounting element from snagging on said serpentine spring means in response to movement of said second mounting element away from said second end member.

5. In a seat as recited in claim 4 wherein:
   said guide means on each mounting element extends downwardly and outwardly from the receiving means on that mounting element away from the adjacent cushion end.

6. In a seat as recited in claim 4 wherein:
   said deflecting means on each mounting element extends upwardly and inwardly from the receiving means on that mounting element toward the opposite cushion end.

7. In a seat as recited in claim 4:
   a plurality of said first and second mounting elements on said seat cushion;
   each of said first mounting elements being spaced from the other, and each of said second mounting elements being spaced from the other;

and a plurality of said first and second tongue means on said end members, each tongue means being aligned with a respective mounting element.

8. In a seat as recited in claim 1 wherein:

said receiving means has a channel-shaped vertical cross-section including a web portion and a pair of flange portions;

outward and inward ends on said web portion;

said guide means comprising ramp means extending from said outward end of the web portion on said receiving means;

said deflecting means comprising planar means extending upwardly and inwardly from the inward end of said web portion.

9. In a seat:

a frame having an end member;

serpentine spring means mounted on said frame adjacent said end member;

a seat cushion supportable upon said serpentine spring means;

said seat cushion having a bottom;

a mounting element connected to said bottom of the seat cushion;

horizontally disposed tongue means on said end member and extending toward said serpentine spring means;

means on said mounting element for receiving said tongue means to engage said seat cushion on said frame;

said seat cushion comprising flexible means for permitting the seat cushion to be flexed and unflexed to move said mounting element respectively away from and toward said end member;

and deflecting means on the mounting element for preventing said mounting element from snagging on the serpentine spring means in response to movement of the mounting element away from said end member.

10. In a seat as recited in claim 9 wherein:

said mounting element comprises guide means for guiding said tongue means toward said receiving means in response to movement of said mounting element toward said end member.

* * * * *